US009858094B2

United States Patent
Desineni et al.

(10) Patent No.: US 9,858,094 B2
(45) Date of Patent: Jan. 2, 2018

(54) MONITORING AND ACTUATION OF VIEW CONTROLLER PARAMETERS TO REACH DEEP STATES WITHOUT MANUAL DEVELOPER INTERVENTION

(71) Applicant: Samsung Electronics Co., Ltd., Suwon-si, Gyeonggi-do, OT (KR)

(72) Inventors: Kalyan Desineni, Mountain View, CA (US); Manikandan Sankaranarasimhan, Hayward, CA (US); Vasanthakumar Sarpasayanam, Villianur (IN); Danny Tsechansky, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/235,650

(22) Filed: Aug. 12, 2016

(65) Prior Publication Data

US 2017/0132023 A1    May 11, 2017

Related U.S. Application Data

(60) Provisional application No. 62/274,150, filed on Dec. 31, 2015, provisional application No. 62/253,632, filed on Nov. 10, 2015.

(51) Int. Cl.
*G06F 9/44* (2006.01)
*G06F 9/445* (2006.01)

(52) U.S. Cl.
CPC ............ *G06F 9/44521* (2013.01); *G06F 8/61* (2013.01)

(58) Field of Classification Search
CPC ................ G06F 9/44521; G06F 8/61
(Continued)

(56) References Cited

U.S. PATENT DOCUMENTS 4,833,604 A   5/1989   Cheng et al.
6,405,362 B1  6/2002   Shih et al.
(Continued)

FOREIGN PATENT DOCUMENTS

EP         2728474 A1      5/2014
KR    20130112613 A       10/2013

OTHER PUBLICATIONS

Internet Engineering Task Force (IETF)—URI Template—J. Gregorio, Google—R. Fielding, Adobe—M. Hadley, MITRE—M. Nottingham, Rackspace—D. Orchard, Salesforce.com—Mar. 2012.*

(Continued)

*Primary Examiner* — Francisco Aponte
(74) *Attorney, Agent, or Firm* — Jefferson IP Law, LLP

(57) ABSTRACT

A mobile application development system includes a developer portal configured to receive a copy of a first application from a first developer and provide a routing library to the first developer for incorporation into the first application before distribution. An offline analysis system uses a static analyzer to identify a set of view controllers implemented in the first application and uses a dynamic analyzer to execute the first application and, during execution, monitor messages invoking the set of view controllers and extract selector parameters used to invoke the set of view controllers. The routing library includes instructions that receive a link from an operating system and, based on a view controller name in the link, allocate memory for a view controller object indicated by the link. The instructions further initialize the view controller object based on selector parameters indicated by the link and using the allocated memory.

32 Claims, 10 Drawing Sheets

(58) Field of Classification Search
USPC ........................................................ 717/163
See application file for complete search history.

(56) References Cited

U.S. PATENT DOCUMENTS

| | | | | |
|---|---|---|---|---|
| 6,996,798 | B2* | 2/2006 | Ali | G06F 8/10 715/234 |
| 7,437,358 | B2* | 10/2008 | Arrouye | G06F 17/301 |
| 7,721,219 | B2 | 5/2010 | Harsh et al. | |
| 7,756,890 | B2* | 7/2010 | Carter | G06F 17/30867 707/776 |
| 7,870,499 | B2* | 1/2011 | Latzina | G06F 9/4443 715/763 |
| 7,873,353 | B2 | 1/2011 | Kloba et al. | |
| 8,326,858 | B2* | 12/2012 | Jenson | G06F 17/30876 707/766 |
| 8,489,591 | B2* | 7/2013 | Wolosin | G06F 17/3087 707/707 |
| 8,762,360 | B2* | 6/2014 | Jiang | G06F 17/30867 706/14 |
| 8,966,407 | B2* | 2/2015 | Shacham | G06F 17/3089 715/711 |
| 9,146,972 | B2* | 9/2015 | Chang | G06F 17/30864 |
| 9,256,697 | B2* | 2/2016 | Jiang | G06F 17/30905 |
| 9,336,525 | B2* | 5/2016 | Singh | G06F 3/0482 |
| 9,424,006 | B2* | 8/2016 | Abadi | G06F 9/45529 |
| 9,538,319 | B1* | 1/2017 | Gigliotti | H04W 4/02 |
| 2002/0002637 | A1 | 1/2002 | Takeda et al. | |
| 2002/0052916 | A1 | 5/2002 | Kloba et al. | |
| 2002/0059425 | A1 | 5/2002 | Belfiore et al. | |
| 2002/0194399 | A1 | 12/2002 | Asakura | |
| 2003/0079215 | A1 | 4/2003 | Hundt et al. | |
| 2003/0088865 | A1 | 5/2003 | Lim et al. | |
| 2005/0034121 | A1 | 2/2005 | Fisher et al. | |
| 2005/0228775 | A1* | 10/2005 | Nilsen | G06Q 30/02 |
| 2007/0067373 | A1 | 3/2007 | Higgins et al. | |
| 2007/0180380 | A1* | 8/2007 | Khavari | G06F 17/243 715/704 |
| 2008/0200161 | A1* | 8/2008 | Morse | G06F 17/30867 455/418 |
| 2008/0214157 | A1 | 9/2008 | Ramer et al. | |
| 2008/0222160 | A1 | 9/2008 | MacDonald et al. | |
| 2011/0066972 | A1 | 3/2011 | Sugiura | |
| 2011/0151979 | A1 | 6/2011 | Boesen et al. | |
| 2011/0154287 | A1* | 6/2011 | Mukkamala | G06F 8/20 717/105 |
| 2011/0225569 | A1 | 9/2011 | Beaty et al. | |
| 2011/0307897 | A1 | 12/2011 | Atterbury et al. | |
| 2012/0011167 | A1 | 1/2012 | Schmidt | |
| 2012/0096366 | A1 | 4/2012 | Narla et al. | |
| 2012/0124061 | A1* | 5/2012 | Macbeth | G06F 9/445 707/749 |
| 2012/0130801 | A1 | 5/2012 | Baranov et al. | |
| 2013/0110815 | A1 | 5/2013 | Tankovich et al. | |
| 2013/0111328 | A1* | 5/2013 | Khanna | G06F 17/3089 715/234 |
| 2013/0218836 | A1* | 8/2013 | Sullivan | G06Q 10/109 707/613 |
| 2013/0247006 | A1 | 9/2013 | Trowbridge | |
| 2013/0304729 | A1 | 11/2013 | Jiang et al. | |
| 2013/0318207 | A1* | 11/2013 | Dotter | H04L 29/08117 709/219 |
| 2014/0026113 | A1* | 1/2014 | Farooqi | G06F 8/34 717/107 |
| 2014/0109080 | A1 | 4/2014 | Ricci | |
| 2014/0129265 | A1* | 5/2014 | Arena | G06Q 50/14 705/5 |
| 2014/0281891 | A1 | 9/2014 | Sulcer et al. | |
| 2014/0310724 | A1 | 10/2014 | Chan et al. | |
| 2015/0040104 | A1 | 2/2015 | Mall et al. | |
| 2015/0074407 | A1* | 3/2015 | Palmeri | H04L 63/166 713/171 |
| 2015/0082239 | A1* | 3/2015 | Zhao | H04L 67/2823 715/788 |
| 2015/0095471 | A1* | 4/2015 | Singh | G06F 3/0482 709/221 |
| 2015/0156061 | A1* | 6/2015 | Saxena | H04L 41/0803 715/733 |
| 2015/0178724 | A1 | 6/2015 | Ngo et al. | |
| 2015/0185997 | A1* | 7/2015 | Jain | G06F 9/4445 715/762 |
| 2015/0309789 | A1* | 10/2015 | Thorat | G06F 8/71 717/121 |
| 2015/0309811 | A1 | 10/2015 | Wisgo | |
| 2015/0339746 | A1 | 11/2015 | Desai et al. | |
| 2015/0379152 | A1* | 12/2015 | Bentley | G06F 17/30876 715/745 |
| 2016/0021215 | A1* | 1/2016 | Spencer | G06F 8/54 717/115 |
| 2016/0092339 | A1 | 3/2016 | Straub et al. | |
| 2016/0094654 | A1* | 3/2016 | Raman | H04L 67/1095 715/733 |
| 2016/0117388 | A1 | 4/2016 | Fan | |
| 2016/0142858 | A1* | 5/2016 | Molinet | H04L 67/42 709/203 |
| 2016/0142859 | A1* | 5/2016 | Molinet | H04L 67/42 709/203 |
| 2016/0239284 | A1* | 8/2016 | Boudville | G06F 8/61 |
| 2016/0292728 | A1* | 10/2016 | Kang | G06Q 30/0267 |
| 2016/0335333 | A1 | 11/2016 | Desineni et al. | |
| 2017/0031874 | A1* | 2/2017 | Boudville | H04L 29/06 |
| 2017/0046141 | A1 | 2/2017 | Desineni et al. | |
| 2017/0046142 | A1 | 2/2017 | Desineni et al. | |
| 2017/0046180 | A1 | 2/2017 | Desineni et al. | |
| 2017/0076471 | A1* | 3/2017 | Prophete | G06T 11/206 |
| 2017/0132024 | A1 | 5/2017 | Desineni et al. | |

OTHER PUBLICATIONS

Breaking and Fixing Origin-Based Access Control in Hybrid Web/Mobile Application Frameworks—Martin Georgiev, Suman Jana, and Vitaly Shmatikov—The University of Texas at Austin—NDDS Symp. Feb. 2014; 1-15.*

Internet Engineering Task Force (IETF)—URI Template—J. Gregorio, Google; R. Fielding, Adobe; M. Hadley, MITRE; M. Nottingham, Rackspace; D. Orchard, Salesforce.com—Standards Track—Mar. 2012.*

U.S. Appl. No. 15/235,859, filed Aug. 12, 2016, Desineni.

Austin, Alex. "Technical Guide to Android Deep Linking: URI Schemes". Blog.branch.io, https://blog.branch.io/technical-guide-android-deep-linking-uri-schemes/, Aug. 8, 2016.

Buchanan, Bryce et al. "The Right Way to Swizzle in Objective-C". New Relic blog. https://blog.newrelic.com/2014/04/16/right-way-to-swizzle/, Apr. 16, 2014.

International Search Report and Written Opinion for PCT Application No. PCT/IB2016/055211 mailed Dec. 8, 2016.

International Search Report and Written Opinion for PCT Application No. PCT/IB2016/055213 mailed Dec. 16, 2016.

MDL ("Mobile Deep Linking"), 2014 Source: MobileDeepLinking. org, Link: http://mobiledeeplinking.org.

International Search Report and Written Opinion for PCT Application No. PCT/IB2016/054880, dated Dec. 2, 2016, 11 pages.

Lenin Ravindranath et al., "Applnsight: Mobile App Performance Monitoring in the Wild", [Online], 2012, pp. 107-120, [Retrieved from Internet on Jun. 6, 2017], https://www.usenix.org/system/files/conference/osdi12/osdi12-final-91.pdf.

Piotr Bar et al., "Towards a Monitoring Feedback Loop for Cloud Applications", [Online], 2013, pp. 43-44, [Retrieved from Internet on Jun. 6, 2017], https://research.spec.org/icpe_proceedings/2013/multicloud/p43.pdf.

Ben Medler et al., "Data Cracker: Developing a Visual Game Analytic Tool for Analyzing Online Gameplay", [Online], 2011, pp. 1-10, [Retrieved from Internet on Jun. 6, 2017], http://delivery.acm.org/1 0.1145/1980000/1979288/p2365-medler.pdf.

Mehmet A. Nacar et al., "GTLAB: Grid Tag Libraries Supporting Workflows within Science Gateways", [Online], 2007, pp. 194-199,

(56) References Cited

OTHER PUBLICATIONS

[Retrieved from Internet on Jun. 6, 2017], http://ieeexplore.ieee.org/stamp/stamp.jsp?arnumber=4438533.

* cited by examiner

MONITORING AND ACTUATION OF VIEW CONTROLLER PARAMETERS TO REACH DEEP STATES WITHOUT MANUAL DEVELOPER INTERVENTION

CROSS-REFERENCE TO RELATED APPLICATIONS

This application claims the benefit of U.S. Provisional Application No. 62/274,150, filed Dec. 31, 2015, and U.S. Provisional Application No. 62/253,632, filed Nov. 10, 2015. The entire disclosures of the applications referenced above are incorporated by reference.

FIELD

The present disclosure relates generally to deep linking to specific states of mobile applications.

BACKGROUND

This section provides background information related to the present disclosure and is not necessarily prior art.

An application (referred to interchangeably in this disclosure as an "app"), such as a mobile app, may contain multiple deep states. For example, in an app that ranks the quality of restaurants based on social media opinion data, the detail page for each restaurant would be considered a deep state. Deep states are reachable from within the app through a sequence of user actions that can involve navigating through multiple menu screens and selections of user interface elements. Each of these menu screens and user interface elements can be mediated by a unique view controller associated with that displayed screen.

Usually, these deep states are accessible only from within the app itself. Web search engines operating outside the app, for example, cannot reach the deep states within the app. This requires considerable interaction by the user. When a user conducts a conventional web search for restaurants and wants to explore one of the returned choices in a specialized restaurant ranking app, the user would have to manually copy and paste the name of the selected search result into the search field of the restaurant ranking App and command the restaurant ranking app to access its internal deep state corresponding to the selected restaurant.

If deep states of apps could be exposed to external apps and computer processes, the user could enjoy the augmented functionality, for example, of being able to begin a search for a suitable restaurant using an Internet-based search server and then to have the results of that search automatically displayed in the appropriate deep linked page of a specialized restaurant ranking app.

However, implementing such functionality requires developer effort and requires deep linking expertise that the developer may not possess. When app development is limited by time or budget, deep link functionality for some or even all of the states of an app may not be a high enough priority to get implemented.

In FIG. 1A, an example relationship between view controllers and views is shown for a hypothetical app 100. The app 100 includes view controllers 104-1, 104-2, and 104-3, which respectively control View A 108-1, View B 108-2, and View C 108-3. The view controllers 104-1, 104-2, and 104-3 (collectively, view controllers 104) are linked so that user action causes a transition from one of the view controllers 104 to another of the view controllers 104.

In the example of FIG. 1A, user action at A invokes the view controller 104-1, which instantiates View A 108-1. User action at B transitions to the view controller 104-2, which instantiates View B 108-2. User action at C transitions to the view controller 104-3, which instantiates View C 108-3. User action at D transitions from the view controller 104-3 back to the view controller 104-2, which results in View B 108-2 being instantiated. From the standpoint of View C 108-3, View A 108-1 and View B 108-2 are intermediate views through which user action transitions on the way to View C 108-3.

The app 100 may not include a mechanism for any internal request or external request (such as from a browser or a search function of an operating system) to directly reach View C 108-3. In other words, deep links are not available to View B 108-2 or View C 108-3. Further, even if the developer has implemented internal deep links to allow the app 100 to directly access View B 108-2 or View C 108-3, the app 100 may not have exposed this deep linking capability so that deep link instructions can be submitted to the app 100 from external sources.

In FIG. 1B, another example visual representation of the relationship between views and view controllers is shown. A hypothetical app 150 includes view controller 154-1 and view controller 154-2 (collectively, view controllers 154). As seen in FIG. 1B, a single view controller (such as the view controller 154-1) may be responsible for multiple views.

View A 158-1 and View B 158-2 are both controlled by the view controller 154-1. Meanwhile, View C 158-3 is controlled by the view controller 154-2. Collectively, View A 158-1, View B 158-2, and View C 158-3 are referred to as "views 158." View A 158-1 may be the default view displayed when the app 150 is started. User action at B may transition from View A 158-1 to View B 158-2, a transition that is mediated by the view controller 154-1. User action at C may transition from View B 158-2 to View C 158-3, which is accompanied by a corresponding handoff from the view controller 154-1 to the view controller 154-2. User action at D transitions from View C 158-3 back to View B 158-2.

View A 158-1 and View B 158-2 may have some similarities and may, therefore, be controlled by the same view controller 154-1. For example, View A 158-1 may be responsible for supporting basic restaurant information, while View B 158-2 may be responsible for displaying more detailed restaurant information. In another example, where the app 150 is a general travel app instead of a restaurant-specific app, View A 158-1 may correspond to restaurant information while View B 158-2 may correspond to event information.

In some app implementations, a single view controller may control all of the views. In other implementations, each view may be controlled by an independent view controller. A view may correspond to a template, or layout, which can be populated with different entity information. The view controllers 154 and the views 158 may be developed according to the model-view-controller (MVC) software architecture pattern.

For example, View B 158-2 may display restaurant information from a data model and may therefore include elements for displaying the name of the restaurant, representative pictures of the restaurant, reviews of the restaurant, and user interface elements for performing actions, such as booking a table at the restaurant, writing a review, etc. The view controller 154-1 may instantiate View B 158-2 with respect to a specific restaurant, at which point the metadata for that restaurant is used to populate View B 158-2 in order to render View B 158-2 for display to the user.

SUMMARY

A mobile application development system includes a developer portal configured to receive a copy of a first application from a first developer and provide a routing library to the first developer for incorporation into the first application before the first developer distributes the first application via a digital distribution platform. The mobile application development system includes an offline analysis system that includes a static analyzer and a dynamic analyzer. The static analyzer is configured to identify a set of view controllers implemented in the first application. The set of view controllers includes at least one member. The dynamic analyzer is configured to execute the first application and, during execution, monitor messages invoking the set of view controllers and extract selector parameters used to invoke the set of view controllers. The routing library includes instructions that, upon installation of a copy of the first application in a user device: receive a link from an operating system of the user device; based on a view controller name in the link, allocate memory for a view controller object indicated by the link; and initialize the view controller object based on selector parameters indicated by the link and using the allocated memory.

In other features, by incorporating the routing library, the first application is configured to register a first uniform resource identifier (URI) template with the operating system. In other features, the first URI template is a unique scheme that includes a text string ending with a colon and two forward slashes. In other features, the text string is a concatenation of a text identifier associated with the developer portal and a name of the first application.

In other features, the routing library includes instructions that set the initialized view controller object as a root view controller. In other features, the routing library includes instructions that initialize the view controller object also based on a selector name indicated by the link. In other features, the link includes a data structure. The routing library includes instructions that decode the data structure within the link. The decoded data structure includes the view controller name and the selector parameters. In other features, the data structure is formatted as JSON (JavaScript Object Notation) encoded with Base64.

In other features, the link includes a unique identifier. The routing library includes instructions that retrieve a data structure based on the unique identifier. The data structure includes the view controller name and the selector parameters. In other features, the mobile application development system includes a data server configured to store view controller names and selector parameters determined by the offline analysis system. The routing library includes instructions that query the data server using the unique identifier. The data server responds to the query with the data structure.

In other features, the mobile application development system includes a data server configured to store view controller names and selector parameters determined by the offline analysis system. The routing library includes instructions that, upon the first execution of the first application, download a plurality of data structures from the data server for storage in a data store local to the routing library. The routing library includes instructions that retrieve the data structure from the data store in response to the unique identifier. In other features, the developer portal is configured to receive a debug build of the first application from the first developer. In other features, the static analyzer is configured to determine class names of the set of view controllers and determine names of constructor methods for the set of view controllers.

In other features, the dynamic analyzer is configured to, upon detecting a message internal to the executing copy of the first application corresponding to one of the determined constructor method names, extract at least one constructor selector parameter from the message and store the at least one constructor selector parameter along with the determined class name of the corresponding view controller.

A system includes the above mobile application development system and a search system configured to return results to the user device in response to a search commissioned by the user device. A first result of the returned results includes the link. In response to selection of the first result by a user of the user device, the link is transmitted to the routing library by the operating system.

A method of operating a mobile application development system includes receiving a copy of a first application from a first developer. The method includes providing a routing library to the first developer for incorporation into the first application before the first developer distributes the first application via a digital distribution platform. The routing library includes instructions that, upon installation of a copy of the first application in a user device: receive a link from an operating system of the user device; based on a view controller name in the link, allocate memory for a view controller object indicated by the link; and initialize the view controller object based on selector parameters indicated by the link and using the allocated memory. The method includes identifying a set of view controllers implemented in the first application using static analysis. The set of view controllers includes at least one member. The method includes, in a processing system remote from the user device, executing the first application and, during execution, (i) monitoring messages invoking the set of view controllers and (ii) extracting selector parameters used to invoke the set of view controllers.

In other features, by incorporating the routing library, the first application is configured to register a first uniform resource identifier (URI) template with the operating system. The first URI template is a unique scheme including a text string ending with a colon and two forward slashes. The text string is a concatenation of (i) a text identifier associated with the mobile application development system and (ii) a name of the first application.

In other features, the method includes storing view controller names and the extracted selector parameters in a data store. The link includes a unique identifier. The routing library includes instructions that query the mobile application development system using the unique identifier. The method includes responding to the query with a data structure. The data structure includes a view controller name and selector parameters obtained from the data store based on the unique identifier.

In other features, the method includes, using static analysis, determining class names of the set of view controllers and determining names of constructor methods for the set of view controllers. In other features, the method includes, while executing the first application, upon detecting a message internal to the executing copy of the first application corresponding to one of the determined constructor method names, extracting at least one constructor selector parameter from the message and storing the at least one constructor selector parameter along with the determined class name of the corresponding view controller. In other features, the method includes receiving a search request commissioned by the user device. The method includes, in response to the search request, returning results to the user device. A first result of the returned results includes the link.

Further areas of applicability will become apparent from the description provided herein. The description and specific examples in this summary are intended for purposes of illustration only and are not intended to limit the scope of the present disclosure.

DRAWINGS

The drawings are for illustrative purposes only of selected embodiments, and not all possible implementations, and are not intended to limit the scope of the present disclosure.

Corresponding reference numerals indicate corresponding parts throughout the several views of the drawings.

DETAILED DESCRIPTION

Figure 1A:
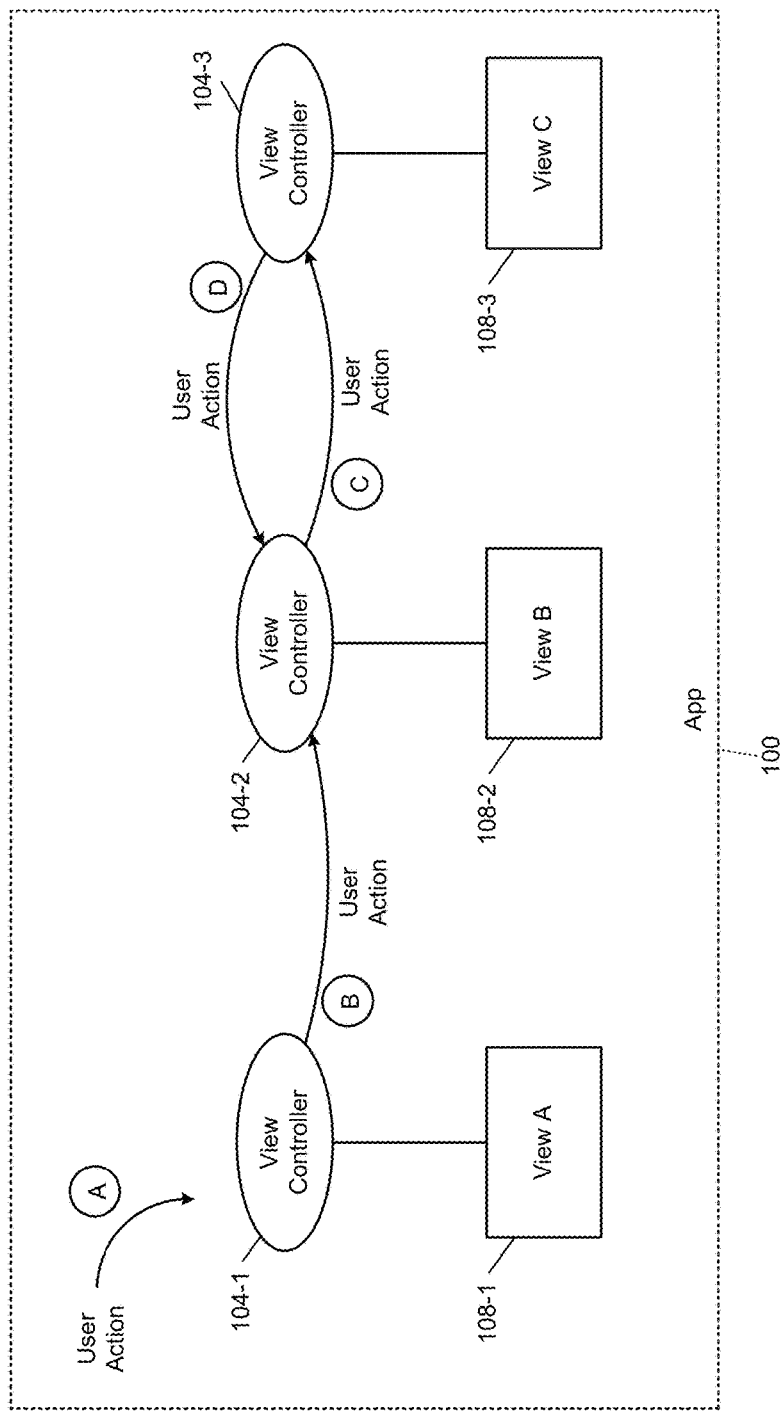
FIG. 1A is a graphical representation of example relationships between views and view controllers in an example app.
Figure 1B:
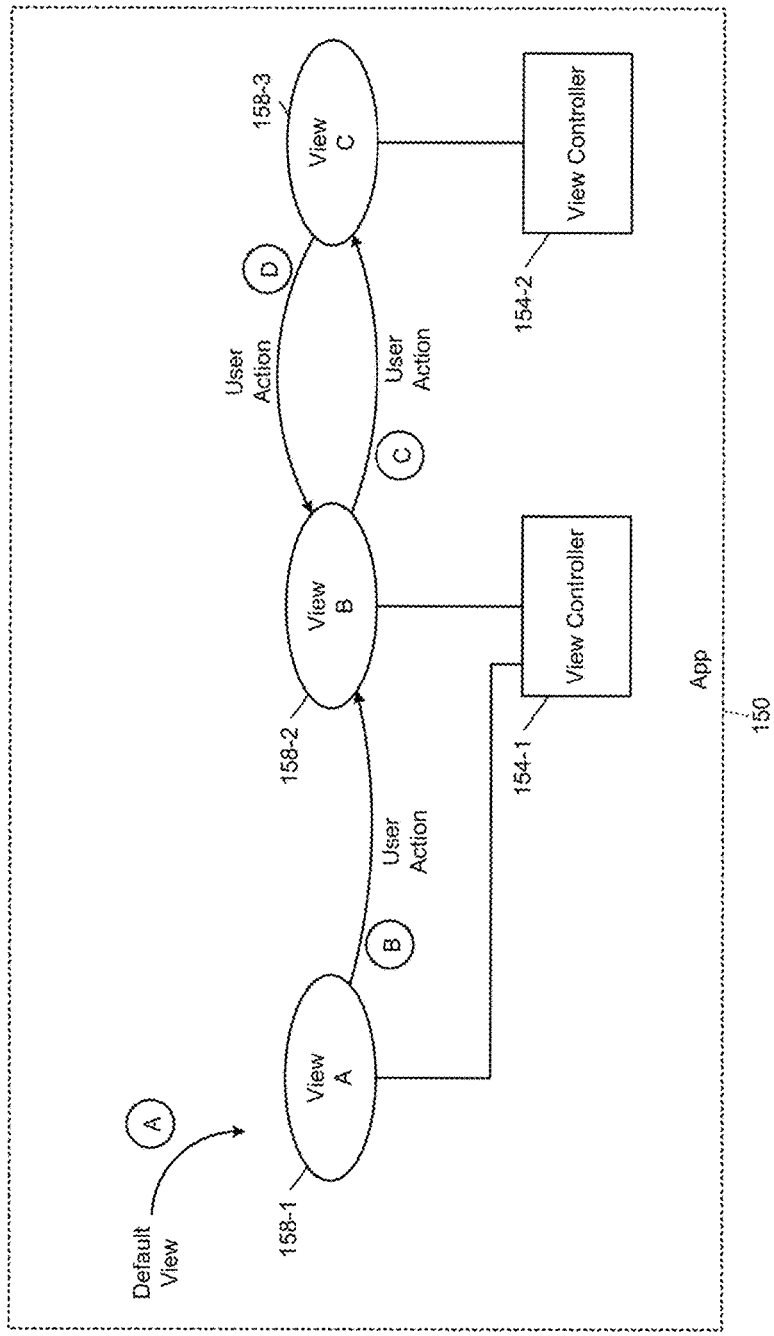
FIG. 1B is another graphical illustration of example relationships between views and view controllers in an example app.

For developers who have not had the time or resources to implement deep link functionality for more than a subset of the states of their app, the present disclosure describes how the developer can augment their app with minimal developer intervention. Specifically, a developer portal according to the principles of the present disclosure provides the app developer with a routing library for incorporation into the developer's app.

This routing library may be referred to as a dynamic link library (DLL), a dylib, or a software development kit (SDK). The routing library may be supplied to the developer's integrated development environment (IDE), such as Xcode developed by Apple, Inc. In some implementations, the developer simply has to associate the routing library with the app under development and needs to perform no other modification of the app or the app's code. In other implementations, the developer may also have to perform a step of modifying a configuration file, such as by adding a line corresponding to the routing library to an information property list (Info.plist) file for the app under development.

Meanwhile, the developer portal supplies the app to an offline analysis system that identifies the view controllers within the app and determines how to access each of the view controllers. Further, the offline analysis determines which parameters are used when accessing view controllers and saves this data for use by the routing library. The data from the app can be sent to the routing library as required in order to reach a view of interest within the app.

To reach a certain state, the routing library can autonomously perform view controller interactions in a series using the acquired parameters. This series of view controller interactions may be longer than the shortest possible path taken by a human familiar with the app, though in some implementations, each interaction is performed more quickly than is possible for the average user. While traversing the entire path may be faster when performed autonomously than when performed manually by a user, a user watching the user device may be able to observe, likely briefly, some or all of the view controller interactions.

Without further efforts from the developer, the app now has deep link functionality that can be accessed from external resources. For example, a search system could provide results that lead directly to deep states of the app. Or a third party app could easily direct users to deep states of the app. This may increase the visibility of the app and allow for tighter integration and better overall user experience with the app.

In addition, now that the developer portal has analyzed the app and is responsible for deep linking, deep links can be added or modified without requiring assistance from the software programmers, who may be working on other projects and have other priorities. In other words, an advertising or marketing professional working for an app developer may use the developer portal to identify which states of the app should be deep-linkable. The advertising or marketing professional could even remove states from the list of deep-linked states, all without requiring the input of a software programmer.

Figure 2:
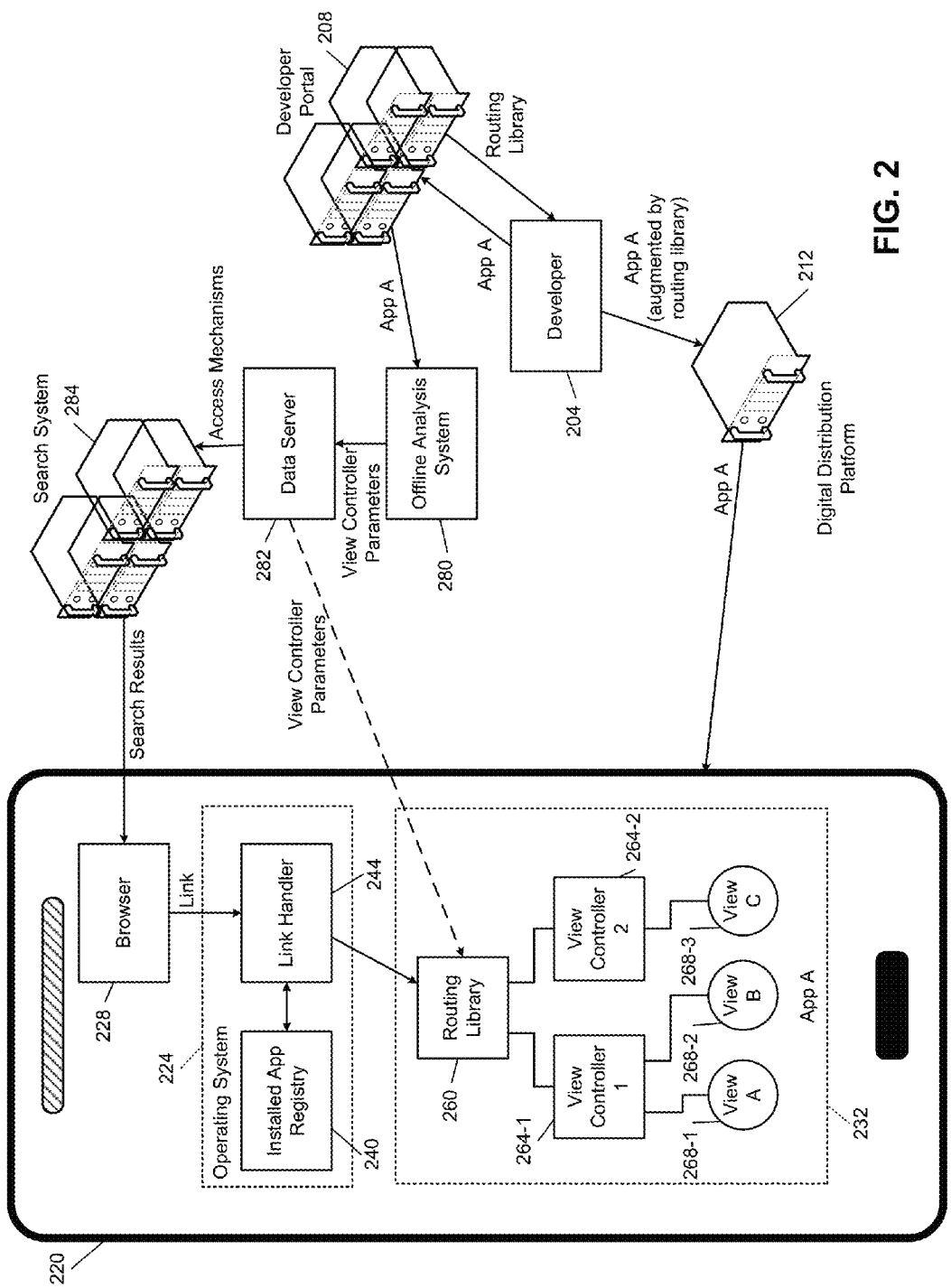
FIG. 2 is a high-level functional block diagram of a mobile application environment according to the principles of the present disclosure.

In FIG. 2, additional details are presented. As noted above, a developer 204 provides an app (referred to as "App A") to a developer portal 208. The developer portal 208 provides a copy of a routing library to the developer 204 for incorporation into App A.

The developer 204 provides the augmented App A, which is still referred to as App A for simplicity, to a digital distribution platform 212 for distribution to end users. The digital distribution platform 212 provides native apps to user devices and may be specific to an operating system. Example digital distribution platforms include the GOOGLE PLAY digital distribution platform by Google, Inc., the APP STORE digital distribution platform by Apple, Inc., and the WINDOWS PHONE digital distribution platform by Microsoft Corp. If the developer 204 had provided App A to the digital distribution platform 212 before augmentation with the routing library, the developer 204 can release the augmented App A as a new version of App A.

The user of a user device 220 installs App A from the digital distribution platform 212. In the user device 220, one or more processors (which may encompass general purpose processors as well as additional co-processors, such as physical sensor processors and graphics processors) execute instructions from memory.

Some of these instructions correspond to an operating system 224, a browser 228, and an installed copy 232 of App A. The operating system 224 includes an installed app registry 240 and a link handler 244. The link handler 244 receives links, such as URLs (uniform resource locators) and URIs (uniform resource identifiers), and determines how to handle those links.

Generally, the link handler 244 handles a link by forwarding it to a registered receiver. The link handler 244 checks the installed app registry 240 to determine whether an app has claimed a particular scheme, domain, or other filter that matches the link. If not, the link may default to being passed to the browser 228, which may have registered a set of schemes for protocols such as HTTP (hypertext transfer protocol), HTTPS (HTTP secure), FTP (file transfer protocol), Telnet, and Gopher.

A routing library 260 (which was received from the developer portal 208) causes App A 232 to register a specific scheme or domain with the installed app registry 240. The scheme may be based on an identifier of the developer portal 208 as well as an identifier of App A. For example, a text string associated with the developer portal 208 (such as "portal") may be concatenated with a text string corresponding to App A (such as "appa"). As a specific example, the scheme registered by App A 232 may be "portal-appa://". In other implementations, the text string associated with the developer portal 208 may not be human-readable.

When the link handler 244 receives a link, such as from the browser 228, where the scheme matches "portal-appa://", the link handler 244 forwards that link to App A 232, where the link is received and handled by the routing library 260. The routing library 260 parses the link and initializes a view controller to instantiate a particular view indicated by the link.

For illustration only, in FIG. 2, view controller 264-1 and view controller 264-2 (collectively, "view controllers 264") are displayed, though additional view controllers may be present (such as a view controller for each view) or a single view controller may be present (which controls all views). The view controller 264-1 controls View A 268-1 and View B 268-2 in this illustration, while the view controller 264-2 controls View C 268-3.

In parallel with providing the routing library from the developer portal 208 to the developer 204, the developer portal 208 provides App A to an offline analysis system 280. The copy of App A provided to the developer portal 208 may be a standard release build, such as an iOS App Store Package (ipa file). In other implementations, the copy of App A provided to the developer portal 208 may be a special build that allows App A to be run in a simulator, and may include symbols, debugging info, and/or source code that would not ordinarily be present in an app distributed by the digital distribution platform 212. This may allow the offline analysis system 280 to more efficiently or accurately analyze App A. For example, the copy of App A may be a debug build designed to run in the Simulator app from Apple, Inc. on the OS X operating system.

The offline analysis system 280, as described in more detail below, determines view controller parameters that can be used by the routing library to reach specific views of App A. The view controller parameters constitute an access mechanism for reaching a deep state of interest within App A.

These view controller parameters may be provided to a data server 282. The data server 282 includes a data store, such as a relational database, that stores view controller parameters for each app processed by the offline analysis system 280. In some implementations, the data server 282 may be implemented as a cloud-based block storage service, such as the S3 (Simple Storage Service) service available from Amazon Web Services.

The view controller parameters may be treated as access mechanisms, which define how deep views can be reached and specify deep links for such purposes as display advertisements and search results. Other potential access mechanisms may include native deep links prepared by the app developer themselves, or standard URLs pointing to a web edition of an app.

A search system 284 receives view controller parameters from the data server 282 in the form of access mechanisms. The search system 284 may already have information about states of interest of App A and then can associate the access mechanisms with the respective states. In other implementations, the search system 284 may crawl and scrape App A to obtain metadata for states of interest, and may use the access mechanisms to find content.

In one use model, the user of the user device 220 performs a search for certain functionality and/or a certain entity, such as reviews for a restaurant of interest. The user may perform this search with a standalone search app or, as shown in FIG. 2, the browser 228. The search system 284, as described in more detail below, provides search results to the browser 228.

These results may include a result corresponding to App A, and may include a link indicating a specific deep state in App A. If the user selects the link corresponding to App A, the link is forwarded to the link handler 244 and then passed to the routing library 260 of App A 232. App A 232 is then controlled by the routing library 260 to display the indicated deep state (or, view) using the appropriate view controller.

In various implementations, the routing library 260 is informed how to actuate the view controller by parameters that are encoded within the link itself. For example, the link (in this case, a URI) may include the scheme ("portal-appa://") followed by a serialized encoding of the view controller parameters needed to render the desired view. For example, the view controller parameters may be specified in a JSON (JavaScript Object Notation) data structure encoded using Base64. As described in more detail below, the serialized encoding may exceed a maximum permitted link length. In such cases, the URI simply points to a server location (such as on the data server 282) where the entire set of view controller parameters is located.

The search system 284 is, therefore, able to provide a link that will take the user directly to relevant content within App A 232. The search system 284 may provide search results to others apps. For example, a hotels app may query the search system 284 for restaurants near the user's selected hotel and the search system 284 may provide restaurant search results to the hotels app. In the case where App A 232 is a restaurant review app, the hotels app can link directly into a deep state of App A 232 corresponding to the restaurant of interest. The search system 284 may provide search results in the form of deep view cards (DVCs). The search system 284 may provide results based on one or both of (i) dynamically-acquired data, which may be obtained by scraping an instance of an app running in an emulator, or (ii) pre-indexed data.

A DVC for an app or a state of an app shows additional information and not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. Text and other content may have been previously scraped from an app in an offline process or may be obtained dynamically from the app using an online scraping process.

The DVC may incorporate elements that allow direct actions, such as the ability to immediately call an establishment or to transition directly to a mapping app to get navigation directions to the establishment. Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

In various implementations, the routing library may be identical for each app with the only exception being the name of the custom scheme that the routing library will register upon installation. The scheme may be formed by concatenating text of the developer portal with text of the app name, and may include a separator such as a hyphen or an underscore. The name of the app may change over time, but the scheme may be fixed after first being set to provide backward compatibility with older versions of the app whose routing library may only recognize the original scheme.

In various implementations, the routing library may be updated with security updates, bug fixes, and feature additions while maintaining backward compatibility. Developers, such as the developer 204, may download and incorporate the newest version of the routing library each time they release a new version of their app to the digital distribution platform 212.

The offline analysis system 280 may need to be invoked each time the developer 204 prepares a new version of App A for the digital distribution platform 212. In addition, as the developer 204 adds more content to App A, the offline analysis system 280 may be invoked to determine the view controller parameters associated with that added content. Invocation of the offline analysis system 280 may be performed at the request of the developer 204 or may be performed on a periodic basis.

Any updates or additions to the view controller parameters are stored by the data server 282 and can be provided to the search system 284 so that links within search results have the most up-to-date access mechanisms. In various implementations, updates to the view controller parameters in between updates of App A may only rarely be necessary.

In some implementations, the view controller parameters may be communicated to the routing library 260 using a mechanism other than direct inclusion in the URI. For example, this may be necessary when a maximum-length link is shorter than the number of characters the encoded view controller parameters may require.

The routing library 260 may, therefore, in some implementations, download a package of view controller parameters from the data server 282. Search results from the search system 284 or other links may then reference a unique identifier, which the routing library 260 maps to a set of view controller parameters. For example only, the unique identifier may be formed from a function and an entity, such as "restaurant_reviews" and "Amarin_Thai". In one specific example, the URI "portal-appa://restaurant_reviews/Amarin_Thai" may be resolved by the routing library 260 to a set of view controller parameters that display the restaurant reviews state for Amarin Thai within App A. However, there is no requirement that the unique identifier be human-readable.

In other implementations, the routing library 260 may consult the data server 282 in response to receiving a deep link. By providing the unique identifier, the routing library 260 can download the necessary view control parameters from the data server 282. In such implementations, the routing library 260 may cache view controller parameters so that a network access isn't required to resolve deep links visited recently. Pre-caching of some or all potential view controller parameters may also be performed, such as when App A 232 first executes on the user device 220.

Pre-caching may happen even earlier, such as when the developer 204 is preparing App A for distribution. In other words, the full set or a subset of the view controller parameters may be included along with App A so that when a unique identifier is received via a link, the appropriate view controller parameters can be chosen by the routing library 260 without delay. Pre-caching may be combined with periodic verification of the view controller parameters by the routing library 260, such as by checking a version number of the package of view controller parameters at a periodic calendar interval, such as once a month. The routing library 260 may verify the freshness of the view controller parameters each time App A is invoked.

In other implementations, the data server 282 may send a push notification to the routing library 260 indicating that new view controller parameters are available. The routing library 260 may register a background process to receive the push notifications, such as when App A 232 does not support push notifications.

To the extent that the developer 204 had implemented some deep links within App A, a developer-implemented router (not shown) in App A 232 would receive links from the link handler 244. The developer's routing code would not have registered "portal-appa://" but instead a scheme independent of the developer portal 208, such as "appa-.com://". The developer routing code may also invoke view controllers, such as the view controller 264-1 and the view controller 264-2. In various implementations, the developer-specified URIs may not be publicly available or may only be available to companies with an established relationship with the developer 204.

Some operating systems, including the iOS operating system, have sandboxed infrastructure to limit the extent to which an app can access resources or areas of memory beyond what has been specifically allocated to the app. Sandboxing enhances security, making it more difficult for malicious software to compromise a user system. Because the routing library 260 executes within the context of App A 232, the sandbox should pose no difficulty for interactions between the routing library 260 and the view controllers 264.

Figure 3A:
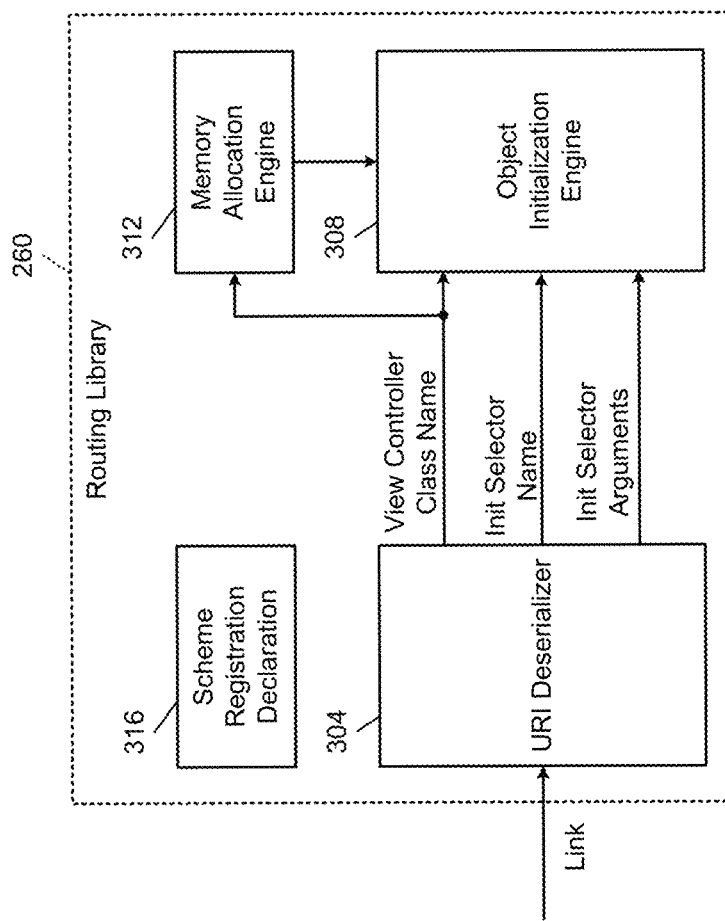
FIG. 3A is a functional block diagram of an example implementation of a routing library.

In FIG. 3A, an example implementation of the routing library 260 includes a URI deserializer 304, which receives a link, such as from the link handler 244 in FIG. 2, and extracts a data structure from the link. The data structure may include a view controller class name, an init selector name, and init selector arguments, which are provided to an object initialization engine 308. A memory allocation engine 312 allocates memory for the creation of a view controller based on the view controller class name.

While the discussion below uses the iOS operating system from Apple, Inc. as an example, the principles of the present disclosure apply to other operating systems, including the Android operating system from Google Inc. For example, while the Android operating system may not have a fixed function like continueUserActivity, a state can be invoked with a specific action to be performed. Invoking a certain state in the Android operating system requires a package name plus a name of the desired activity class.

To allocate memory, the memory allocation engine 312 makes a reference to the class object of the view controller. For example, such as in the iOS operating system, the memory allocation engine 312 uses a built-in NSClassFromString( ) function, passing the view controller class name as input. The object initialization engine 308 may then create an NSInvocation using the method signature of the init selector. Then, the target, selector, and arguments are set for the invocation object, and the invocation is made using an invoke message.

Once the memory has been allocated, the object initialization engine 308 initializes an instance of the view controller using the allocated memory and providing the init selector name and the init selector arguments.

The following code shows how to create a view controller object with class RestaurantViewController, having a single-argument init method called "initWithId:" and argument value "abc":

```
// Allocation
UIViewController* restaurantVC =
[NSClassFromString("RestaurantViewController") alloc];
// preparing for initialization
SEL selector = NSSelectorFromString("initWithId:");
NSMethodSignature* signature = [restaurantVC
methodSignatureForSelector:selector];
NSInvocation* invocation = [NSInvocation
invocationWithMethodSignature:signature];
[invocation setTarget:restaurantVC];
[invocation setSelector:selector];
NSString* arg = @"abc";
[invocation setArgument:&arg atIndex:2];
// initialize
[invocation invoke];
```

Once the view controller object is created, it can be made active by setting it as the root view controller of the window, such as with the following operations:

```
id<UIApplicationDelegate> appDelegate = [UIApplication
sharedApplication].delegate;
appDelegate.window.rootViewController = restaurantVC;
```

A scheme registration declaration 316 identifies the scheme, such as "portal-appa://", to be registered by the routing library 260. In various implementations, the scheme registration declaration 316 is located in a configuration file, such as Info.plist.

Figure 3B:
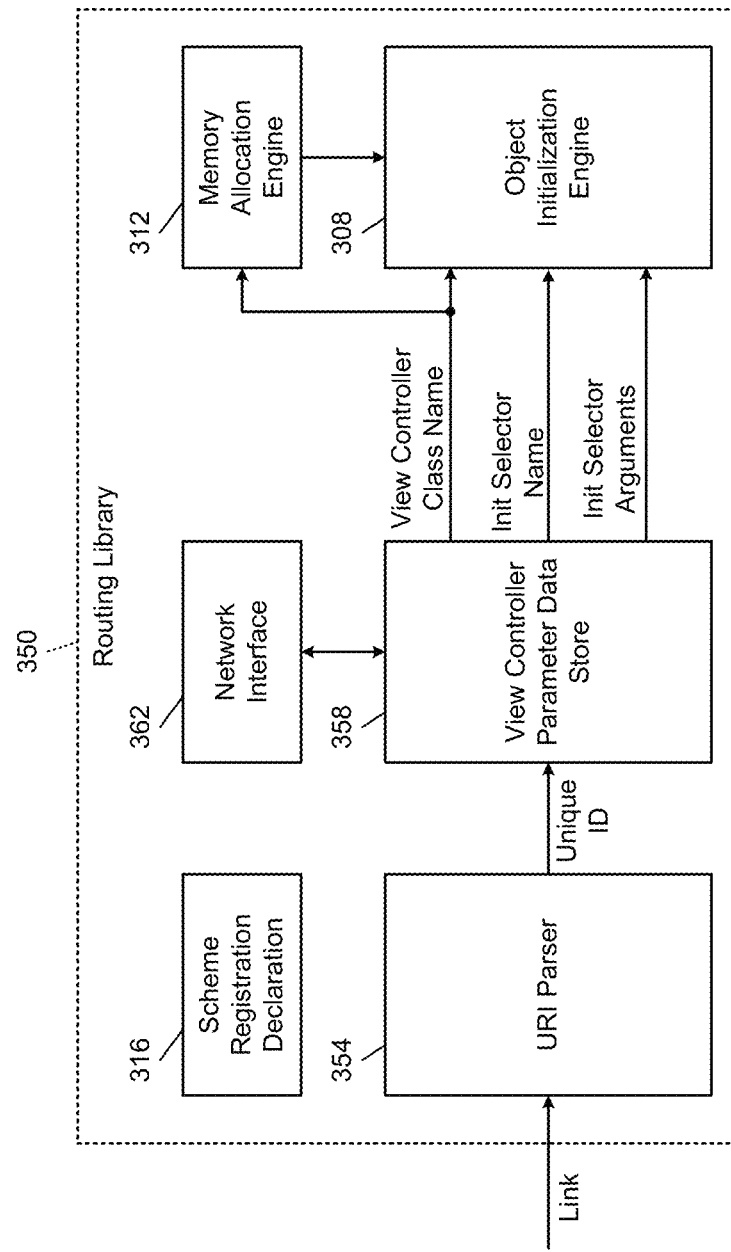
FIG. 3B is a functional block diagram of another example implementation of a routing library.

In FIG. 3B, a routing library 350 includes elements similar to or identical to the scheme registration declaration 316, the memory allocation engine 312, and the object initialization engine 308 of FIG. 3A. In the routing library 350, a URI parser 354 receives a link, such as from an operating system of a user device in which the routing library 350 is installed. The link may be a URI that conforms to the scheme specified in the scheme registration declaration 316.

The URI parser 354 extracts a unique ID from the link, which may be performed simply by taking the text of the URI to the right of the pair of forward slashes in the URI. The unique ID is used to index a view controller parameter data store 358. The view controller parameter data store 358 stores a set of view controller parameters, such as a view controller class name, an init selector name, and init selector arguments, for one or more unique IDs.

If the view controller parameter data store 358 does not include a set of view controller parameters for the unique ID, the view controller parameter data store 358 may access a source of view controller parameters, such as the data server 282 of FIG. 2, via a network interface 362.

In some implementations, the view controller parameter data store 358 retrieves a complete package of all available view controller parameter sets via the network interface 362 when the app incorporating the routing library 350 is first executed on a user device. In some implementations, each time the app incorporating the routing library 350 is started, the view controller parameter data store 358 may query the data server 282 to retrieve new and updated view controller parameters.

Figure 4:
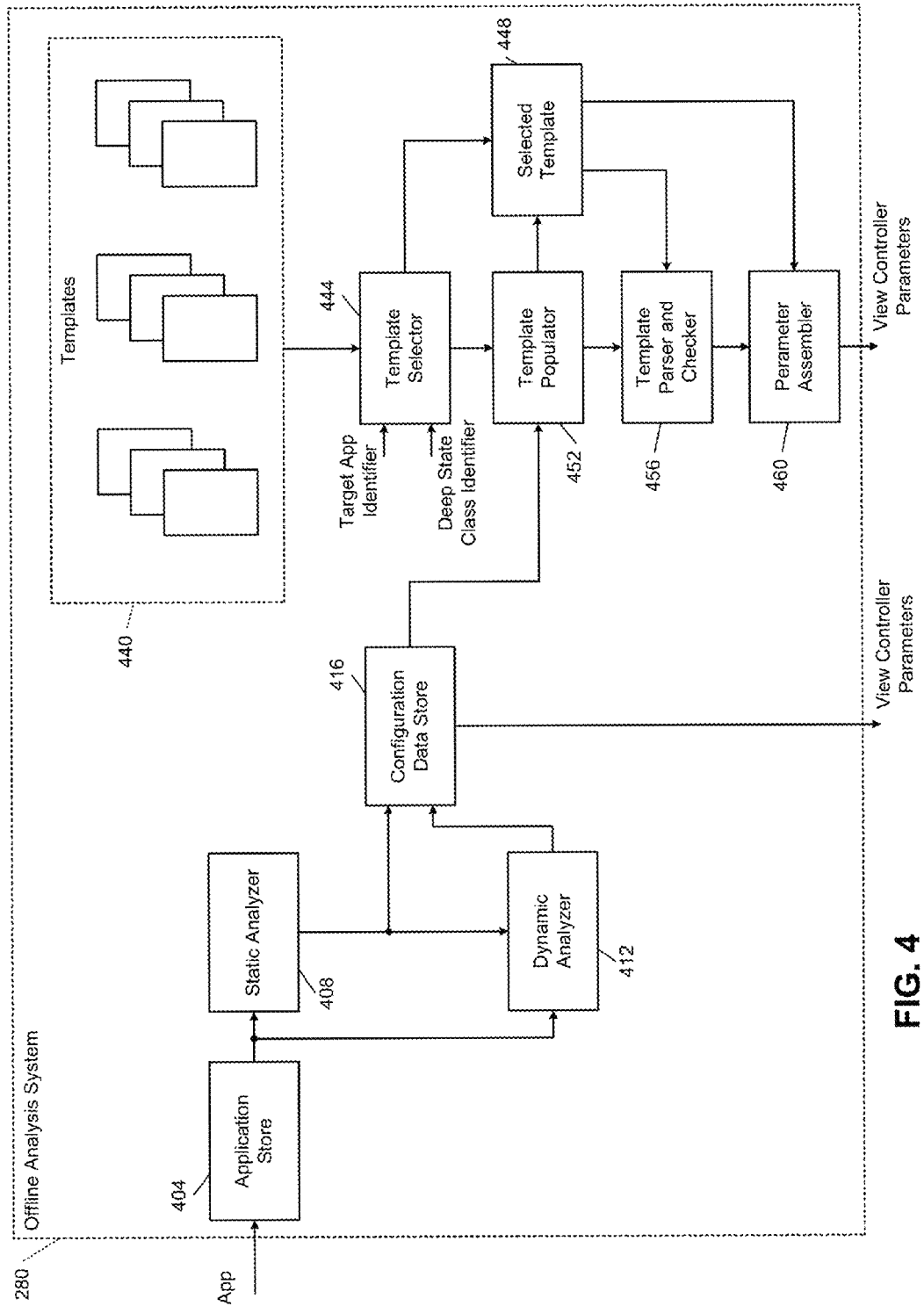
FIG. 4 is a functional block diagram of an example implementation of an offline analysis system.

In FIG. 4, an example implementation of the offline analysis system 280 includes an application store 404, which receives and stores an app, such as the unaugmented version of App A, for analysis. In various implementations, the app may have been programmed using the Objective-C programming language or the Swift programming language, and may include source code as well as object code.

The offline analysis system 280 learns the existing view controller architecture of App A. A static analyzer 408 ascertains information such as class names of view controllers implemented by App A and names of init and/or constructor methods. The static analyzer 408 may identify class names of the entire set of view controllers in App A, where that set may include a single view controller or multiple view controllers. In other implementations, the static analyzer 408 may identify class names of only a subset of view controllers of App A.

Based on this information, a dynamic analyzer 412 observes the application during execution, listening for messages passed to the view controllers—that is, listening for init/constructor method calls. When relevant messages are detected, the dynamic analyzer 412 extracts the argument values passed to the method. In this way, the dynamic analyzer 412 determines the constructor parameters needed to instantiate a view controller. These parameters are stored in a configuration data store 416.

The static analyzer 408 operates on the code of the app itself while the app is not running. The static analyzer 408 may first disassemble object code to determine instructions. The static analyzer 408 may analyze the disassembled object code to identify calls to ViewController methods and extract view controller name arguments from the calls.

The static analyzer 408 may perform symbolic execution to determine which parameters are used for which view controller. Additional information regarding static analysis can be found in U.S. patent application Ser. No. 14/984,642, filed Dec. 30, 2015, and titled "Static Analysis and Reconstruction of Deep Link Handling and Compiled Applications," with first-named inventor Kalyan Desineni. The entire disclosure of this application is incorporated by reference. In contrast to the incorporated application, the present disclosure may perform symbolic execution for ViewController methods instead of for NSUserActivity or CSSearchableItem.

The dynamic analyzer 412 listens to messages being passed by the executing application and traces operation of the view controllers identified by the static analyzer 408. The dynamic analyzer 412 logs each invocation of the view controller and records the associated argument values. The dynamic analyzer 412 may be implemented based on tools such as the Cycript application, the Hopper application, and/or the Logify application.

The dynamic analyzer 412 may rely on a method swizzling technique to override the default view controller method. Method swizzling is a process of changing the implementation of an existing selector. It takes advantage of a property of languages such as Objective-C that method invocations can be changed at run time by changing how selectors are mapped to underlying functions in a class's dispatch table. The dynamic analyzer 412 may perform method swizzling to observe and record the data based on a particular method, so that when the view controller is launched, the same data values can be passed to that method.

The routing library 260 may also perform method swizzling within the app. For example, the routing library 260 may perform method swizzling on the app delegate's "application:didFinishLaunchingWithOptions:". This may allow the routing library 260 to activate immediately upon launch of App A 232. The routing library 260 may use method swizzling for additional purposes within App A 232. For example, in some implementations, method swizzling completely replaces and overrides the functionality of an existing method, while in other contexts method swizzling supplements functionality of the existing method, such as by intercepting a method call, performing some actions, and then passing the call (either modified or unchanged) to the existing method.

The dynamic analyzer 412 provides detected view controller argument values, class names, and init selector names to the configuration data store 416. Data from the configuration data store 416 may be provided to the search system 284 of FIG. 2.

In other implementations, a template system may first templatize the configuration data. A predefined set of templates 440 is stored on a computer-readable medium. A template selector 444 receives data regarding what app is being augmented and, optionally, what deep state class or classes are being implemented. This data may be extracted using the static analyzer 408 and the dynamic analyzer 412, or may be provided by or supplemented by a software developer or operator of the developer portal 208 of FIG. 2.

The template selector 444 selects one or more of the templates 440 as needed for the identified app and the classes of deep states to be accessed. A selected template 448 is populated by a template populator 452. The template populator 452 substitutes parameters from the configuration data store 416 into placeholders of the selected template 448. A template parser and checker 456 scans the selected template 448 after population to check for missing arguments or parameters. After checking, a parameter assembler 460 prepares a package of view controller parameters, such as for the search system 284 in FIG. 2. The view controller parameters may include a populated and checked template for each view controller identified in the app.

Figure 5:
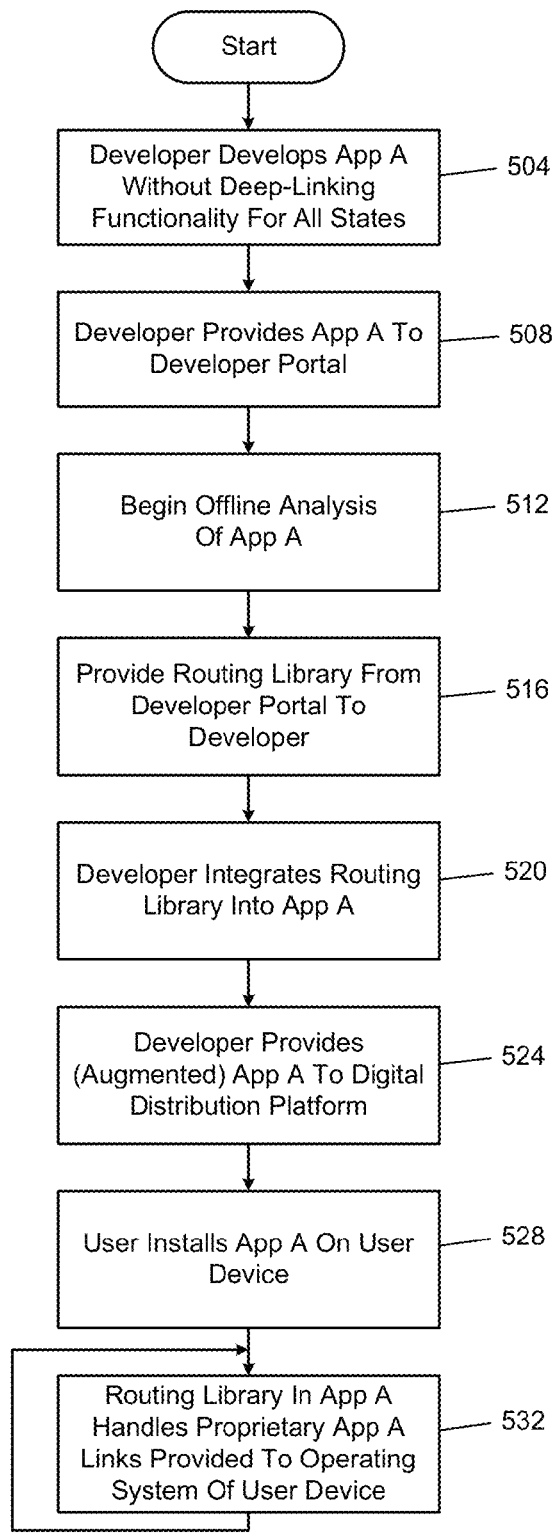
FIG. 5 is a flowchart of example overall operation of a mobile application ecosystem according to the principles of the present disclosure.

In FIG. 5, an overview of the operation of the present disclosure begins at 504. A developer develops an app ("App A") but does not implement deep linking functionality for all states, and maybe does not implement deep linking functionality for any states. At 508, the developer determines that deep linking functionality may be valuable to users of App A as well as may increase the visibility of App A, so the developer provides App A to a developer portal. At 512, control of the developer portal begins offline analysis of App A.

At 516, the developer portal provides a routing library to the developer. At 520, the developer integrates the routing library into App A. This integration may be as simple as adding the routing library to the integrated development environment by importing a header file and an object file. In other implementations, the routing library may have multiple header files. Further, the routing library may be implemented as a software development kit or a binary file.

At 524, the developer provides App A, as augmented with the routing library, to a digital distribution platform. At 528, a user installs App A on a user device. At 532, the routing library within App A handles proprietary App A links that are provided by the operating system of the user device. For example, these links may come from a browser, a search app, or another app that is aware of deep linking. Control remains at 532 with respect to this installation of App A, where the routing library in App A continues to handle proprietary App A links until the application is uninstalled from the user device.

Figure 6:
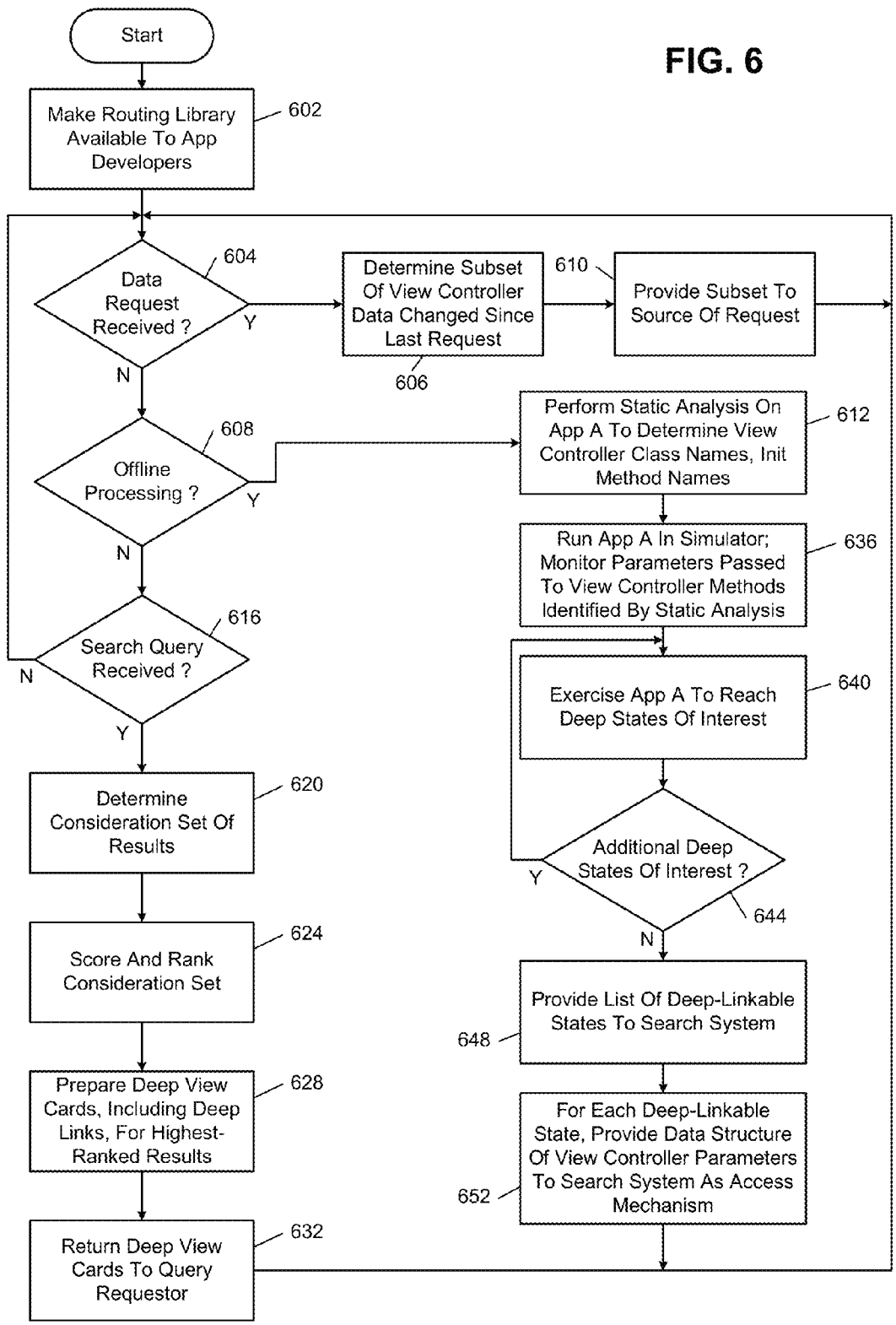
FIG. 6 is a flowchart of example operation of deep link creation and provision to user devices according to the principles of the present disclosure.

In FIG. 6, the operation of server-side components may be performed by a single component or may be performed across the developer portal 208, the offline analysis system 280, the data server 282, and the search system 284 of FIG. 2. In various implementations, the developer portal 208, the data server 282, and the search system 284 may be under the control of the same entity. The offline analysis system 280 may employ operators that facilitate static analysis and/or dynamic analysis to ensure that accurate and complete parameters are extracted from each app.

Control begins at 602, where the routing library is made available to app developers. Over time, the routing library may be updated, and the most up-to-date version may be the only one available to app developers. At 604, if a request for view controller parameter data has been received, control transfers to 606; otherwise, control transfers to 608. At 606, control determines a subset of the view controller parameter data that has changed since the last request was received from the requestor. This subset can then be provided at 610 to bring the data up-to-date at the source of the request. Control then returns to 604.

Control continues at 608, where if offline processing of an app has been initiated, control transfers to 612; otherwise, control transfers to 616. At 616, if a search query has been received from a search system, control transfers to 620; otherwise, control returns to 604. At 620, control determines a consideration set of results corresponding to the search query. This consideration set may include apps that are open to the search query as well as specific states (deep states) of apps that are relevant to the search query.

At 624, control scores the elements in the consideration set based on how closely they match the understood intent of the search query. The scored results can then be ranked from most relevant to least relevant. At 628, the highest-ranked results are formatted as deep view cards associated with deep links to the specific states within the results. At 632, control returns the deep view cards to the requestor of the query.

The deep view cards may not be fully rendered, and instead include images, text, and instructions on how to render the deep view cards for particular screen sizes, orientations, and other requirements of the requesting application or operating system. For apps where the deep links are serviced by a routing library according to the principles of the present disclosure, an access mechanism returned along with the corresponding search result may include a URI with an encoded data structure.

The encoded data structure may include the view controller parameters necessary to invoke that specific state from within the app. The URI, being a string, includes a serialized version of that data structure and is prefixed with a scheme. The scheme, such as "portal-appa://", will cause the URI to be forwarded to and recognized by the routing library of the app. Control then returns to 604.

At 612, control performs a static analysis on App A to determine the view controller class names and init method names. At 636, control runs App A, such as in a simulator. While App A is running, control monitors parameters passed to view controller methods that were identified by static analysis in 612. At 640, control exercises App A to reach deep states of interest so that their view controller parameters can be recorded. At 644, if there are additional deep states of interest, control returns to 640; otherwise, control continues at 648.

In various implementations, exercising App A may be performed using a crawling algorithm. For additional information regarding crawling, see U.S. patent application Ser. No. 14/849,540, filed Sep. 9, 2015, and titled "Unguided Application Crawling Architecture," with first-named inventor Kalyan Desineni. The entire disclosure of this application is incorporated by reference.

At 648, control provides a list of deep-linkable states to a search system for indexing. At 652, for each deep-linkable state, control provides a data structure of view controller parameters to the search system to be used in a URI as an access mechanism to access the deep state. Control then returns to 604.

Figure 7A:
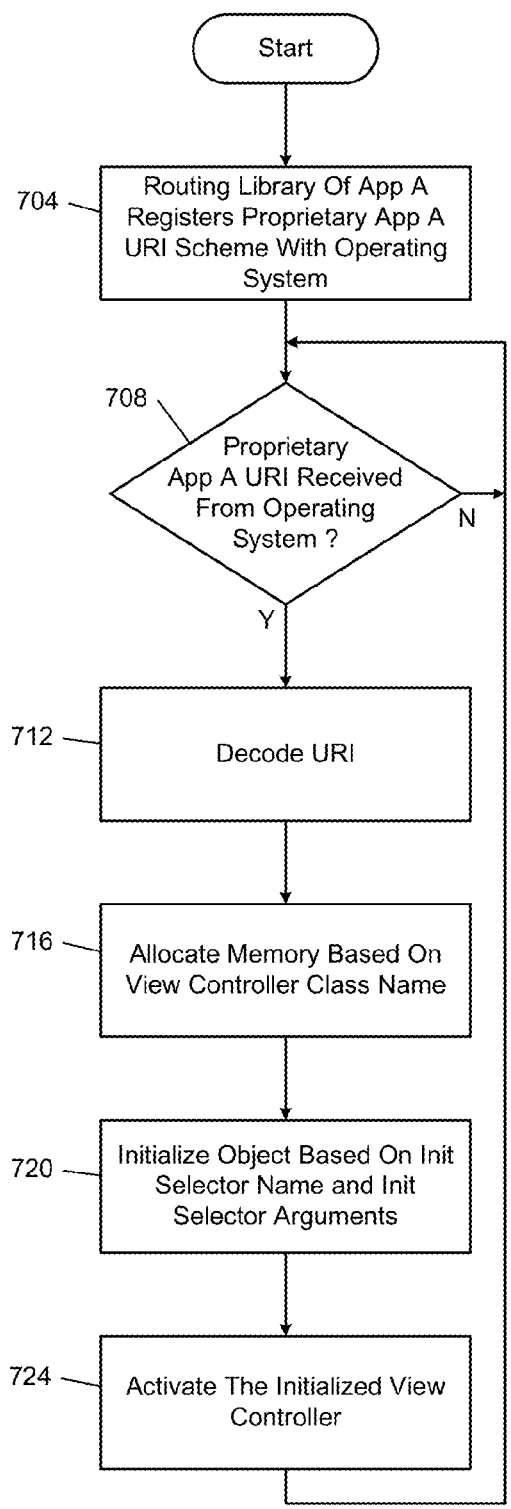
FIG. 7A is a flowchart of example routing operation within a developer's app.

In FIG. 7A, example operation of a routing library begins upon installation of the host app ("App A" in this example). At 704, the routing library of App A registers a proprietary App A URI scheme with the operating system. At 708, if a proprietary App A URI is received from the operating system, control transfers to 712; otherwise, control remains at 708.

At 712, the URI is decoded to obtain a data structure. Based on the contents of the data structure, at 716 control allocates memory based on a view controller class name from the URI. At 720, control initializes an object using the allocated memory based on view controller class name, init selector name, and init selector arguments from the URI. At 724, control activates the initialized view controller. Control then returns to 708.

Figure 7B:
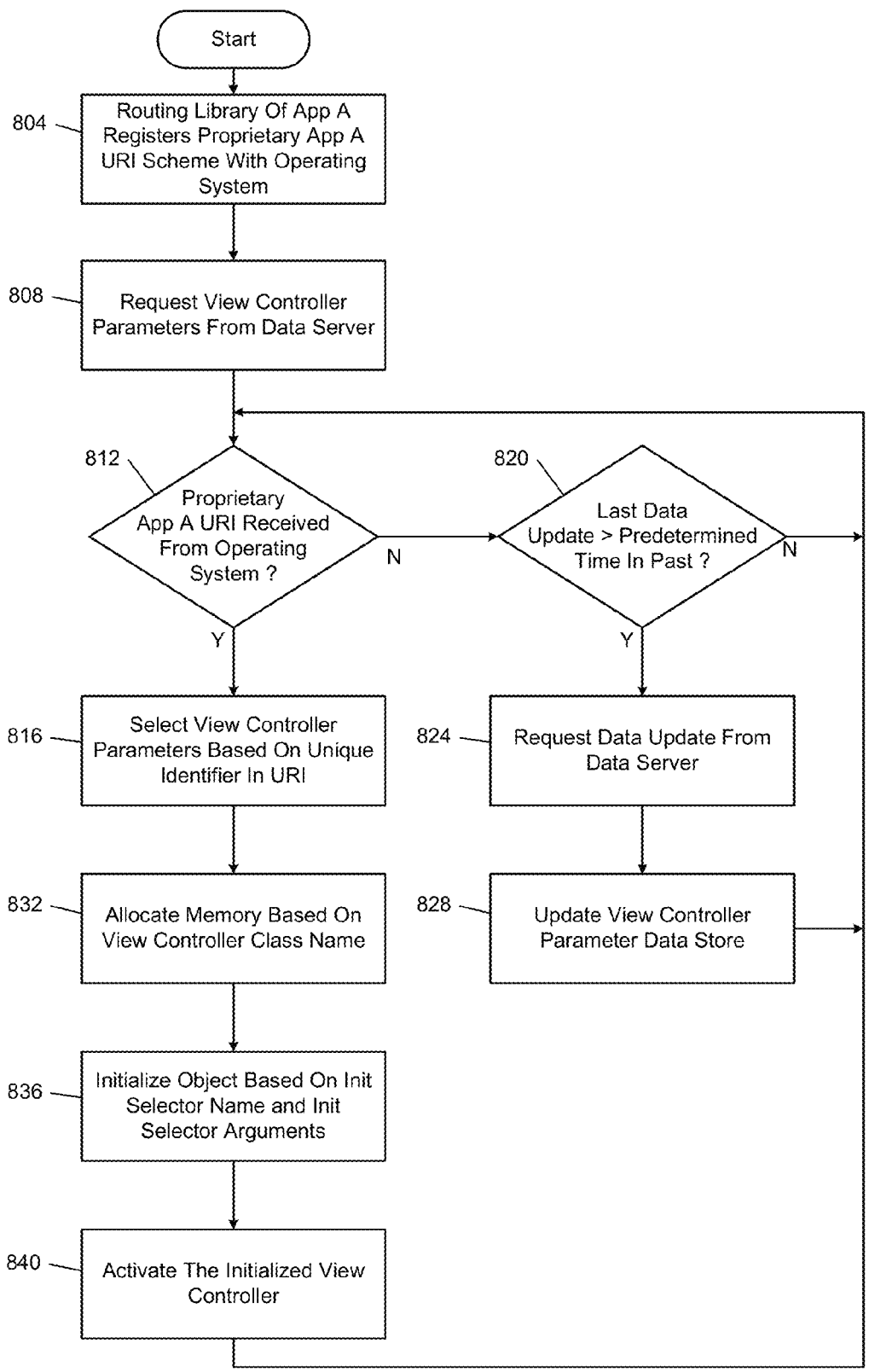
FIG. 7B is another flowchart of example routing operation within a developer's app.

In FIG. 7B, control begins at 804, where the routing library of an example app ("App A") registers a scheme with the operating system of a user device onto which App A is installed. The scheme may be a proprietary scheme specific to App A and assigned by the provider of the routing library.

In various implementations, this registration may be performed by the operating system as the app is being installed, where the proprietary scheme may be specified in a properties file within the app. In other words, at 804 registration may be performed by the operating system of the user device based on parameters specified by App A due to the routing library having been incorporated into App A.

At 808, upon the first execution of App A, the routing library requests a package of view controller parameters from a data server. This package of view controller parameters may include all of the view controller parameters available for the deep states of App A. In various implementations, the package of view controller parameters may include only those view controller parameters relevant to the more popular states of App A. If a less popular state of App A is requested in a deep link, the routing library can request the view controller parameters for that deep link individually.

At 812, in response to a URI matching the proprietary App A scheme being received, control transfers to 816. Otherwise, control transfers to 820. At 820, control determines whether the last data update from the data server occurred more than a predetermined time in the past. For example only, this predetermined time may be specified as a number of days. If the last data update is too far in the past, control transfers to 824; otherwise, control returns to 812. At 824, control requests the data update from the data server. At 828, control updates the view controller parameters data store with new and/or updated view controller parameters from the data server. Control then returns to 812.

At 816, control selects view controller parameters from the view controller parameter data store based on a unique identifier in the URI. In various implementations, the unique identifier in a URI may be the remainder of the URI string after the scheme (that is, after the pair of forward slashes).

Control continues at 832, where the routing library allocates memory for a view controller object based on the name of the view controller class. At 836, control initializes a view controller object based on a net selector's name and a net selector's arguments from the selected view controller parameters. At 840, control activates the initialized view controller in order to bring the initialized view controller to the foreground. Control then returns to 812.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A mobile application development system comprising:
a developer portal including a first one or more processors configured to:
receive a copy of a first application from a first developer; and
provide a routing library to the first developer for incorporation into the first application before the first developer distributes the first application via a digital distribution platform; and
an offline analysis system comprising:
a second one or more processors configured to identify a set of view controllers implemented in the first application, wherein the set of view controllers includes at least one member; and
a third one or more processors configured to execute the first application and, during execution, monitor messages invoking the set of view controllers and extract selector parameters used to invoke the set of view controllers,
wherein the routing library includes instructions that, upon installation of a copy of the first application in a user device:
receive a link from an operating system of the user device, wherein the link includes a data structure;
decode the data structure within the link, the decoded data structure including a view controller name and selector parameters;
based on the view controller name in the link, allocate memory for a view controller object indicated by the link; and
initialize the view controller object based on the selector parameters indicated by the link and using the allocated memory.

2. The mobile application development system of claim 1, wherein, by incorporating the routing library, the first application is configured to register a first uniform resource identifier (URI) template with the operating system.

3. The mobile application development system of claim 2, wherein the first URI template is a unique scheme including a text string ending with a colon and two forward slashes.

4. The mobile application development system of claim 3, wherein the text string is a concatenation of a text identifier associated with the developer portal and a name of the first application.

5. The mobile application development system of claim 1, wherein the routing library includes instructions that set the initialized view controller object as a root view controller.

6. The mobile application development system of claim 1, wherein the routing library includes instructions that initialize the view controller object based also on a selector name indicated by the link.

7. The mobile application development system of claim 1, wherein the data structure is formatted as JSON (JavaScript Object Notation) encoded with Base64.

8. The mobile application development system of claim 1, wherein the developer portal is configured to receive a debug build of the first application from the first developer.

9. The mobile application development system of claim 1, wherein the second one or more processors are configured to:
  determine class names of the set of view controllers; and
  determine names of constructor methods for the set of view controllers.

10. The mobile application development system of claim 9, wherein the third one or more processors are configured to, upon detecting a message internal to the executing copy of the first application corresponding to one of the determined constructor method names, extract at least one constructor selector parameter from the message and store the at least one constructor selector parameter along with the determined class name of the corresponding view controller.

11. A mobile application development system comprising:
  a developer portal including a first one or more processors configured to:
    receive a copy of a first application from a first developer; and
    provide a routing library to the first developer for incorporation into the first application before the first developer distributes the first application via a digital distribution platform; and
  an offline analysis system comprising:
    a second one or more processors configured to identify a set of view controllers implemented in the first application, wherein the set of view controllers includes at least one member; and
    a third one or more processors configured to execute the first application and, during execution, monitor messages invoking the set of view controllers and extract selector parameters used to invoke the set of view controllers,
  wherein the routing library includes instructions that, upon installation of a copy of the first application in a user device:
    receive a link from an operating system of the user device, wherein the link includes a unique identifier;
    retrieve a data structure based on the unique identifier, wherein the data structure includes a view controller name and selector parameters;
    based on the view controller name in the link, allocate memory for a view controller object indicated by the link; and
    initialize the view controller object based on the selector parameters indicated by the link and using the allocated memory.

12. The mobile application development system of claim 11, further comprising:
  a data server configured to store view controller names and selector parameters determined by the offline analysis system,
  wherein the routing library includes instructions that query the data server using the unique identifier, and
  wherein the data server responds to the query with the data structure.

13. The mobile application development system of claim 11, further comprising:
  a data server configured to store view controller names and selector parameters determined by the offline analysis system,
  wherein the routing library includes instructions that, upon first execution of the first application, download a plurality of data structures from the data server for storage in a data store local to the routing library, and
  wherein the routing library includes instructions that retrieve the data structure from the data store in response to the unique identifier.

14. The mobile application development system of claim 11, wherein, by incorporating the routing library, the first application is configured to register a first uniform resource identifier (URI) template with the operating system.

15. The mobile application development system of claim 11, wherein the first URI template is a unique scheme including a text string ending with a colon and two forward slashes.

16. The mobile application development system of claim 15, wherein the text string is a concatenation of a text identifier associated with the developer portal and a name of the first application.

17. The mobile application development system of claim 11, wherein the routing library includes instructions that set the initialized view controller object as a root view controller.

18. The mobile application development system of claim 11, wherein the routing library includes instructions that initialize the view controller object based also on a selector name indicated by the link.

19. The mobile application development system of claim 11, wherein the developer portal is configured to receive a debug build of the first application from the first developer.

20. The mobile application development system of claim 11, wherein the second one or more processors are configured to:
  determine class names of the set of view controllers; and
  determine names of constructor methods for the set of view controllers.

21. The mobile application development system of claim 20, wherein the third one or more processors are configured to, upon detecting a message internal to the executing copy of the first application corresponding to one of the determined constructor method names, extract at least one constructor selector parameter from the message and store the at least one constructor selector parameter along with the determined class name of the corresponding view controller.

22. A system comprising:
  the mobile application development system of claim 1; and
  a fourth one or more processors configured to return results to the user device in response to a search commissioned by the user device,
  wherein a first result of the returned results includes the link, and
  wherein, in response to selection of the first result by a user of the user device, the link is transmitted to the routing library by the operating system.

23. A method of operating a mobile application development system, the method comprising:
  receiving a copy of a first application from a first developer;
  storing view controller names and the extracted selector parameters in a data store;

providing a routing library to the first developer for incorporation into the first application before the first developer distributes the first application via a digital distribution platform, wherein the routing library includes instructions that, upon installation of a copy of the first application in a user device:

receive a link from an operating system of the user device, wherein the link includes a unique identifier; and query the mobile application development system using the unique identifier;

responding to the query with a data structure, wherein the data structure includes a view controller name and selector parameters obtained from the data store based on the unique identifier, wherein the routing library further includes instructions that, upon the installation of the copy of the first application in the user device:

based on a view controller name in the link, allocate memory for a view controller object indicated by the link; and initialize the view controller object based on selector parameters indicated by the link and using the allocated memory;

identifying a set of view controllers implemented in the first application using static analysis, wherein the set of view controllers includes at least one member; and in a processing system remote from the user device, executing the first application and, during execution, (i) monitoring messages invoking the set of view controllers and (ii) extracting selector parameters used to invoke the set of view controllers.

24. The method of claim 23, wherein:

by incorporating the routing library, the first application is configured to register a first uniform resource identifier (URI) template with the operating system;

the first URI template is a unique scheme including a text string ending with a colon and two forward slashes; and the text string is a concatenation of (i) a text identifier associated with the mobile application development system and (ii) a name of the first application.

25. The method of claim 23, further comprising, using static analysis:

determining class names of the set of view controllers; and determining names of constructor methods for the set of view controllers.

26. The method of claim 25, further comprising, while executing the first application, upon detecting a message internal to the executing copy of the first application corresponding to one of the determined constructor method names, extracting at least one constructor selector parameter from the message and storing the at least one constructor selector parameter along with the determined class name of the corresponding view controller.

27. The method of claim 23 further comprising:

receiving a search request commissioned by the user device; and in response to the search request, returning results to the user device, wherein a first result of the returned results includes the link.

28. A system comprising:

the mobile application development system of claim 11; and a fourth one or more processors configured to return results to the user device in response to a search commissioned by the user device, wherein a first result of the returned results includes the link, and wherein, in response to selection of the first result by a user of the user device, the link is transmitted to the routing library by the operating system.

29. A mobile application development system comprising:

a developer portal including a first one or more processors configured to:

receive a copy of a first application from a first developer; and provide a routing library to the first developer for incorporation into the first application before the first developer distributes the first application via a digital distribution platform; and an offline analysis system comprising:

a second one or more processors configured to:

identify a set of view controllers implemented in the first application, wherein the set of view controllers includes at least one member;

determine class names of the set of view controllers; and determine names of constructor methods for the set of view controllers; and a third one or more processors configured to:

execute the first application;

during execution, monitor messages invoking the set of view controllers and extract selector parameters used to invoke the set of view controllers;

upon detecting a message internal to the executing copy of the first application corresponding to one of the determined constructor method names, extract at least one constructor selector parameter from the message and store the at least one constructor selector parameter along with the determined class name of the corresponding view controller, wherein the routing library includes instructions that, upon installation of a copy of the first application in a user device:

receive a link from an operating system of the user device;

based on a view controller name in the link, allocate memory for a view controller object indicated by the link; and initialize the view controller object based on selector parameters indicated by the link and using the allocated memory.

30. A method of operating a mobile application development system, the method comprising:

receiving a copy of a first application from a first developer;

providing a routing library to the first developer for incorporation into the first application before the first developer distributes the first application via a digital distribution platform, wherein the routing library includes instructions that, upon installation of a copy of the first application in a user device:

receive a link from an operating system of the user device;

based on a view controller name in the link, allocate memory for a view controller object indicated by the link; and initialize the view controller object based on selector parameters indicated by the link and using the allocated memory;

identifying a set of view controllers implemented in the first application using static analysis, wherein the set of view controllers includes at least one member;

using static analysis:
- determining class names of the set of view controllers; and
- determining names of constructor methods for the set of view controllers; and in a processing system remote from the user device:
- executing the first application;
- during execution, (i) monitoring messages invoking the set of view controllers and (ii) extracting selector parameters used to invoke the set of view controllers; and
- upon detecting a message internal to the executing copy of the first application corresponding to one of the determined constructor method names, extracting at least one constructor selector parameter from the message and storing the at least one constructor selector parameter along with the determined class name of the corresponding view controller.

31. The method of claim 30, wherein:

by incorporating the routing library, the first application is configured to register a first uniform resource identifier (URI) template with the operating system;

the first URI template is a unique scheme including a text string ending with a colon and two forward slashes; and the text string is a concatenation of (i) a text identifier associated with the mobile application development system and (ii) a name of the first application.

32. The method of claim 30 further comprising:

receiving a search request commissioned by the user device; and in response to the search request, returning results to the user device, wherein a first result of the returned results includes the link.

* * * * *